US011177980B2

(12) United States Patent
Patrick et al.

(10) Patent No.: US 11,177,980 B2
(45) Date of Patent: *Nov. 16, 2021

(54) VIRTUAL CONVERGED CABLE ACCESS PLATFORM (CCAP)

(71) Applicant: Harmonic, Inc., San Jose, CA (US)

(72) Inventors: Michael W. Patrick, Assonet, MA (US); Nitsan S. Elfassy, Tel-Mond (IL); Amir Leventer, Kfar Saba (IL); Jeremy C. Rosenberg, Huntingdon Valley, PA (US)

(73) Assignee: Harmonic, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/809,436

(22) Filed: Mar. 4, 2020

(65) Prior Publication Data

US 2020/0204402 A1    Jun. 25, 2020

Related U.S. Application Data

(63) Continuation of application No. 16/028,195, filed on Jul. 5, 2018, now Pat. No. 10,616,000, which is a continuation of application No. 15/438,432, filed on Feb. 21, 2017, now Pat. No. 10,020,962.

(60) Provisional application No. 62/298,354, filed on Feb. 22, 2016.

(51) Int. Cl.
*H04L 12/46* (2006.01)
*H04L 12/28* (2006.01)

(52) U.S. Cl.
CPC ...... *H04L 12/4641* (2013.01); *H04L 12/2801* (2013.01); *H04L 12/4633* (2013.01)

(58) Field of Classification Search
CPC ............. H04L 12/4641; H04L 12/4633; H04L 12/2801; H04L 12/28; H04L 12/46; H04L 67/0227; H04L 67/0254; H04L 67/104; H04L 67/04; H04L 67/18
USPC .................................................. 370/252, 463
See application file for complete search history.

(56) References Cited

U.S. PATENT DOCUMENTS

| 6,442,158 | B1 | 8/2002 | Beser |
| 7,197,556 | B1 | 3/2007 | Short et al. |
| 9,979,564 | B2 | 5/2018 | Finkelstein |
| 2014/0101711 | A1 | 4/2014 | Rakib |

(Continued)

FOREIGN PATENT DOCUMENTS

WO    2017/147086 A1    8/2017

OTHER PUBLICATIONS

Sundaresan, Karthik, "Evolution of CMTS/CCAP Architectures," In Proceedings 2015 Spring Technical Forum, CableLabs, May 7, 2015, 11 pages.

*Primary Examiner* — Candal Elpenord
(74) *Attorney, Agent, or Firm* — Brokaw Patent Law PC; Christopher J. Brokaw

(57) ABSTRACT

Approaches for a virtualized Cable Modem Termination System (CMTS) for providing high speed data services to a remote physical device (RPD). The virtualized Cable Modem Termination System (CMTS) comprises a core routing engine (CRE) for performing packet switching and routing and one or more physical or virtual compute servers (CS) that each perform CMTS functions for the one or more remote physical devices (RPDs). A combination of the core routing engine (CRE) and the one or more physical or virtual compute servers (CS) emulate a single Layer 3 CMTS having a single point of management.

27 Claims, 7 Drawing Sheets

(56) References Cited

U.S. PATENT DOCUMENTS

| | | | |
|---|---|---|---|
| 2015/0052572 A1* | 2/2015 | Schemmann | H04N 21/6118 |
| | | | 725/116 |
| 2015/0092531 A1 | 4/2015 | Bernstein et al. | |
| 2015/0222449 A1 | 8/2015 | Salinger et al. | |
| 2015/0295669 A1* | 10/2015 | Chapman | H04L 12/2801 |
| | | | 370/503 |
| 2016/0294608 A1* | 10/2016 | Biswal | H04L 45/38 |
| 2016/0294611 A1 | 10/2016 | Khambatkone | |

* cited by examiner

VIRTUAL CONVERGED CABLE ACCESS PLATFORM (CCAP)

CLAIM OF PRIORITY

This application claims priority to U.S. Non-Provisional patent application Ser. No. 16/028,195, entitled "Virtual Converged Cable Access Platform (CCAP) Core," invented by Michael W. Patrick et al., filed on Jul. 5, 2018, the entire disclosure of which is hereby incorporated by reference for all purposes as if fully set forth herein.

U.S. Non-Provisional patent application Ser. No. 16/028,195 claims priority to U.S. Non-Provisional patent application Ser. No. 15/438,432, U.S. Pat. No. 10,020,962, entitled "Virtual Converged Cable Access Platform (CCAP) Core," invented by Michael W. Patrick et al., filed on Feb. 21, 2017, issued on Jul. 10, 2018, the entire disclosure of which is hereby incorporated by reference for all purposes as if fully set forth herein.

U.S. Pat. No. 10,020,962 claims priority to U.S. Provisional Patent Application Ser. No. 62/298,354, entitled "Virtual Converged Cable Access Platform (CCAP) Core," invented by Michael W. Patrick et al., filed on Feb. 22, 2016, the entire disclosure of which is hereby incorporated by reference for all purposes as if fully set forth herein.

FIELD OF THE INVENTION

Embodiments of the invention are generally directed towards an emulation of a particular type of cable device, and more particularly, towards an emulation of a cable device in conformance with a Converged Cable Access Platform (CCAP) standard.

BACKGROUND

Converged Cable Access Platform (CCAP) is a standard, proposed and administered by CableLabs of Sunnyvale, Calif., for an architecture employed by a cable operator. The motivation behind CCAP is to lower the operating costs of cable operators via a single platform which can offer traditional video and broadband services to their consumers. CCAP is a managed architecture as it leverages existing cable technologies and makes provisions for new ones that may arise. As a result, cable operators may take many different paths towards conforming to the CCAP standard, and thereafter, may continue to evolve their architecture in many different ways post-compliance to CCAP.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF EMBODIMENTS

Approaches for emulating a cable industry Converged Cable Access Platform (CCAP) device are presented herein. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

The MHAv2 Architecture

Embodiments of the invention are directed towards emulating a cable industry Converged Cable Access Platform (CCAP) device. The emulated CCAP device of an embodiment may appear to be comprised of separate physical devices, e.g., the emulated CCAP device may appear to comprise a commercial layer 2/3 switch and one or more programmable commercial computing servers. Before discussing embodiments of the invention in detail, it will be helpful to appreciate a family of specifications administered by Cablelabs known as Module Headend Architecture Version 2 (MHAv2)

Figure 1:
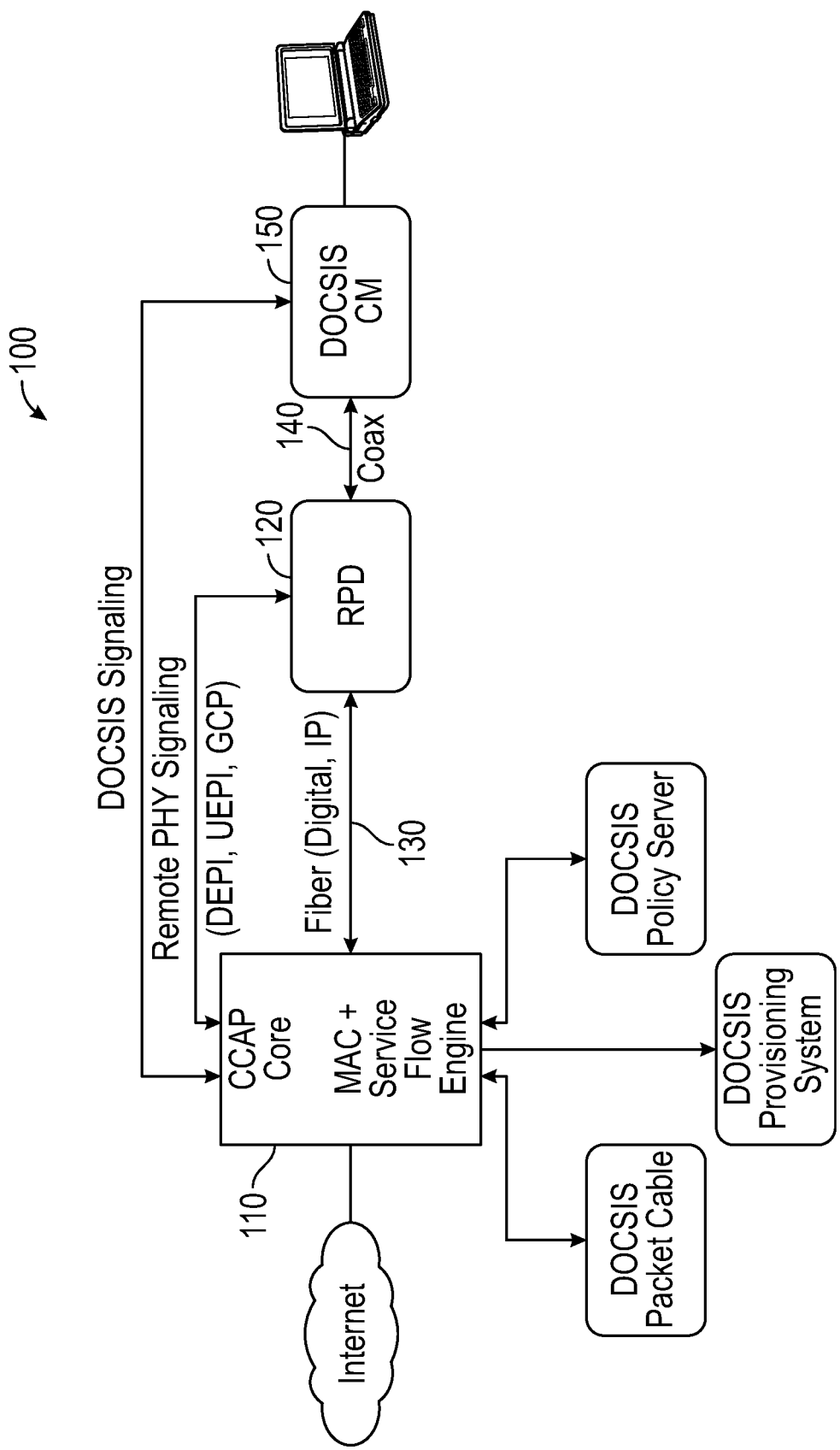
FIG. 1 is a block diagram of exemplary architecture 100 between a CCAP Core and a Remote Physical Device (RPD) according to the prior art.

FIG. 1 is a block diagram of exemplary architecture 100 between a CCAP Core 110 and one or more Remote Physical Devices (RPD) 120 according to the prior art. Architecture 100 of FIG. 1 conforms to the Module Headend Architecture Version 2 (MHAv2) family of protocols. While FIG. 1 depicts a single RPD 120 for simplicity, multiple RPDs 120 may be used. Each RPD 120 may communicate over a coaxial cable 140 to a DOCSIS cable modem.

The MHAv2 architecture 100 depicted in FIG. 1 is intended to permit the combination of a CCAP Core 110 and multiple RPDs 120 to appear as a Cable Modem Termination System (CMTS) to a cable operator. The cable operator is not expected to directly manage the RPDs 120 themselves; instead, the cable operator configures all aspects of RPD operation and obtains all status information from CCAP Core 110. CCAP Core 110 communicates with RPD 120 over fiber connection 130 using various protocols (DEPI, UEPI, and GCP) for configuration, status, and data exchange.

Current industry vendors of CMTSs (one example being Cisco Corporation's product offering called CBR-8) are expected to introduce CCAP Core products based on their existing CMTS chasses. Industry CCAP Cores are expected to maintain the vendor's proprietary chassis, proprietary packet routing engine cards, and proprietary line cards with custom hardware to support the bit-intensive high-speed encryption/decryption and CRC generation required for the DEPI and UEPI data traffic forwarded between CCAP Core 110 and one or more RPDs 120.

Functional Overview

Figure 2:
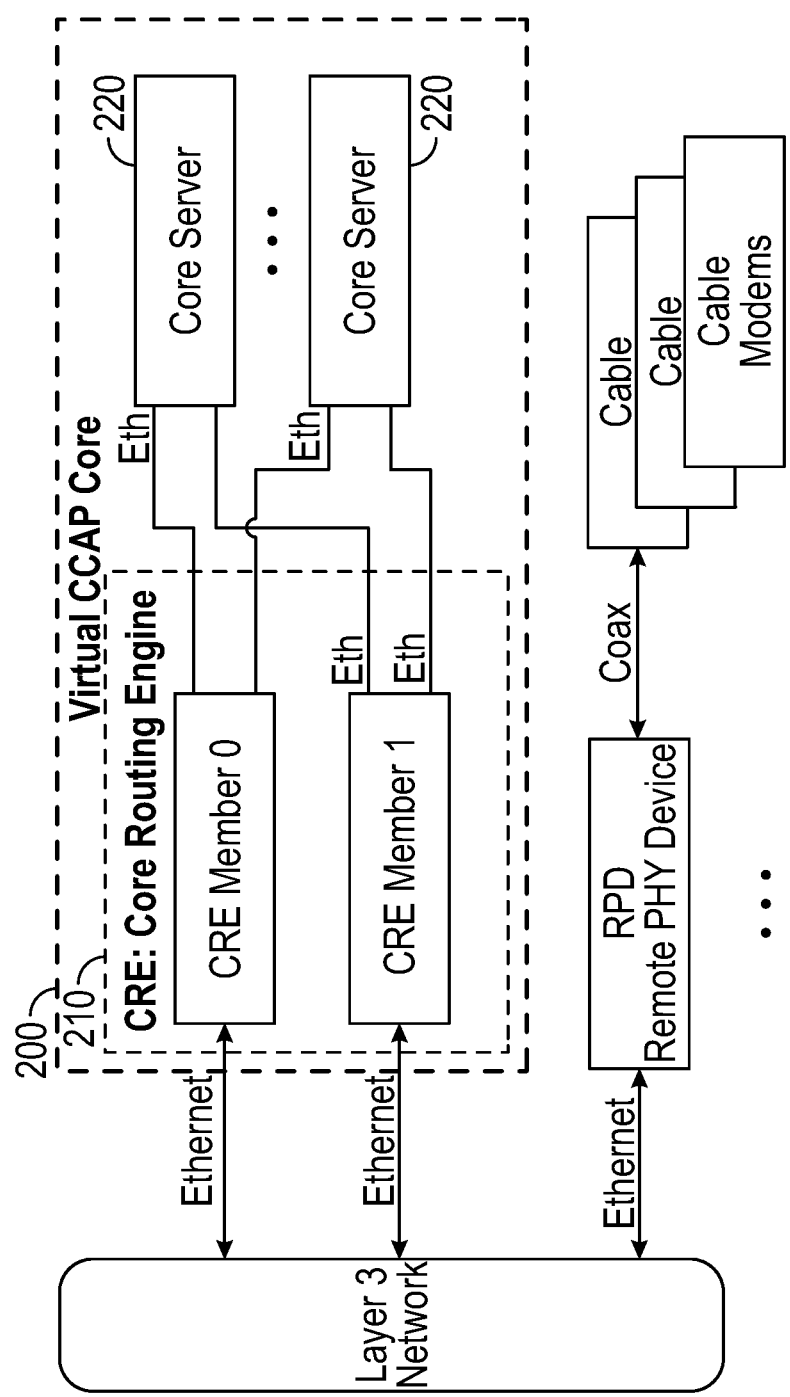
FIG. 2 is a block diagram of the physical components of a Virtual CCAP Core according to an embodiment of the invention.

Embodiments of the invention are directed towards a virtual CCAP Core composed of a Commercial Off-The-Shelf (COTS) packet switch/router and software programmed on COTS computing servers with no proprietary hardware components. FIG. 2 is a block diagram of a system 200 of the physical components according to an embodiment of the invention. Virtual CCAP Core 200 conforms to the MHAv2 architecture discussed in relation to FIG. 1.

In an embodiment, Virtual CCAP Core 200 comprises Core Routing Engine (CRE) 210, which may correspond to a COTS packet switch/router. CRE 210 may advantageously comprise two or more physical "member" components for high availability, e.g., FIG. 2 depicts CRE 210 as comprising two member components identified as Member 0 and Member 1. Virtual CCAP Core 200 may also comprise one or more COTS computing servers that are individually referred to herein as a Core Server 220. A cable system operator may configure and manage Virtual CCAP Core 200 in the same manner as a chassis-based CCAP Core 110 discussed in relation to FIG. 1.

Virtual CCAP Core 200 has many advantages over chassis-based CCAP core 110, such as the COTS components of Virtual CCAP Core 200 being less expensive and easier to procure than the proprietary chassis, routing, and line card hardware of chassis-based CCAP core 110. Additionally, Virtual CCAP Core 200 may scale to support virtually any amount of DOCSIS traffic as additional core servers 220 may be added as needed.

As Virtual CCAP Core 200 relies upon programming general purpose compute servers rather than single-direction line cards, Virtual CCAP Core 200 may flexibly allocate resources between downstream and upstream processing. The use of COTS compute servers permits Virtual CCAP Core 200 to use cluster technology for Network Function Virtualization (NPV) whereby entire classes of network node functions may be virtualized into building blocks that may operate together to create communication services.

In the prior art, existing industry CMTSs are implemented as single chassis products with vendor proprietary hardware. In contrast, embodiments of the invention use of commercial switch/router configuration instead of custom hardware or firmware development on the switch/router.

DOCSIS standards describe the operation of a "Layer 2" or "bridging" CMTS that provides a Layer 2 Ethernet MAC bridging hop between the Network System Interface (NSI) of the CMTS to the Internet and the CPE Ethernet link of a cable modem (CM). Some commercial CMTSs indeed operate at Layer 2, but all such commercially available L2 CMTSs serve a single HFC fiber node and control DOCSIS operation with a single "mac domain" serving at most a few hundred CMs.

A system comprising a single commercial layer 3 switch/router with multiple layer 2 CMTSs, even such Layer 2 CMTSs controlling multiple mac-domains, may well be conceivable in view of current DOCSIS standards. Such a system, however, requires separate and independent management of the Layer 3 switch/router and each layer 2 CMTS. Large-scale cable Hybrid Fiber/Coax (HFC) deployments at the time of this application have dozens of fiber nodes served at the cable head-end, and independent management of each fiber node as a separate L2 CMTS is impractical. As a result, large scale industry deployments use a Layer 3 CMTS that provides an IP routing hop between a CMTS NSI Ethernet port and the CM CPE Ethernet ports. The Layer 3 CMTS provides a single management IP address for the cable operator to control both Layer 3 routing operations on the NSI ports and DOCSIS RF channel operations for the dozens of mac-domains. Advantageously, the MHAv2 architecture of an embodiment supports a single management IP address to control expansion to hundreds of mac-domains, each on a "deep" fiber node with fewer coax repeaters and cable modems.

Embodiments of the invention are physically composed similar to a Layer 2 CMTS deployment, with one commercial L3 switch/router component (CRE 210) and multiple physical components (Core Servers 220) forwarding DOCSIS payload traffic with Layer 2 bridging. In contrast to prior approaches, embodiments emulate a single Layer 3 CMTS with a single point of management for both routing and DOCSIS mac domain operation, especially with only CRE vendor configuration of the commercial switch/router without custom programming.

CRE 210 advantageously implements a Link Aggregation Group (LAG) of at least two Ethernet ports for connections to other network elements, including but not limited to: (1) switch/routers that connect to the Internet via what DOCSIS calls the "Network Systems Interface" (NSI), (2) switch/routers that connect towards head-ends and RPDs in what DOCSIS calls the "Converged Interconnect Network" (CIN), and (3) trunk connections to Core Servers of the Virtual CCAP itself.

Virtual CCAP Configuration

Current industry practice calls for cable operators to configure network elements such as routers and CMTSs with an ASCII-based Command Line Interface (CLI). The cable operator connects to an IP host address of the network element using the SSH or telnet protocol to enter CLI commands. CLI commands consist of two basic modes: "configuration" mode commands that provision the ongoing behavior of the network element and "exec" mode commands that instruct the network element to perform one-time actions. The network element saves and displays its provisioned configuration as a file of configuration-mode CLI commands.

In accordance with prior approaches, a system with separate switch/router and L2 CMTS components would require separate CLI configuration files for the switch/router and each L2CMTS. However, embodiments of the invention configure CRE 210 and all Core Servers 220 with a single CCAP Configuration file for significantly simpler remote management.

In an embodiment, one of Core Servers 220 acts as the Virtual CCAP Core Manager (VCCM) to maintain the configuration of Virtual CCAP Core 200. In one embodiment, the VCCM is configured in the single configuration file (e.g., via Core Server IP or Ethernet MAC address). In another embodiment, Core Servers 220 may employ software to dynamically elect the VCCM among them.

Advantageously, a "standby" VCCM may be configured or elected to takeover for the "active" VCCM should the active VCCM fail. The standby VCCM maintains a copy of the CCAP Core configuration. Unless otherwise indicated, the term "VCCM" shall always mean the currently "active" VCCM Core Server 220.

CRE 210 is initially deployed with its own non-volatile CLI "startup configuration" that provisions its operation from startup. The VCCM dynamically configures the "running configuration" of CRE 210, but the VCCM does not change the CRE's 210 non-volatile "startup configuration" so that it can always be restored with a CRE power-on or reboot.

The startup configuration of CRE 210 provides an untagged virtual LAN between at least two designated "initial" trunk ports connected to Core Servers 220, one for an active VCCM and one for a standby VCCM. The untagged VLAN between trunk ports attached to Core Servers 220 is referred to as the "cluster VLAN" herein.

The startup configuration of CRE 210 configures a router IP interface on the cluster VLAN with a pre-designated IP address on a link-local IP subnet, e.g., 169.254.0.1/24. The active VCCM adds an IP interface to the cluster VLAN with a second pre-designated address on the same subnet, e.g. 169.254.0.2/24. The standby VCCM adds an IP interface with a third pre-designated IP address, e.g., 169.254.0.3/24.

The startup configuration of CRE 210 provisions CRE 210 to advertise Link Layer Discovery Protocol (LLDP) on both initial trunk ports. One initial trunk port is designated as the "primary" VCCM port, while the other initial trunk port is designated the "backup" VCCM port. On startup of CRE 210 with both initial trunk ports connected, at least two Core Servers 220 communicate on the cluster VLAN with link-local IP addresses and select the Core Server 220 attached to the primary VCCM port (as learned from LLDP) as the initially active VCCM.

All other activity specified by the startup configuration of CRE 210 is performed by the (active) VCCM attaching to a CLI shell of CRE 210. An alternative embodiment envisions the VCCM dynamically configuring CRE 210 after startup using Simple Network Management Protocol (SNMP) or the Network Configuration Protocol (Netconf). The connection by which the VCCM manages and monitors CRE 210 is referred to herein as the "CRE Control Tunnel." Embodiments of the invention transform the VCCM configuration into the particular CLI language of CRE 210 without requiring custom programming to be deployed or enacted upon CRE 210.

The VCCM dynamically configures the running configuration of the NSI ports of CRE 210 based on the configuration of Virtual CCAP Core 200. This may include LAG operation of ports on two different CRE 210 members (such as either CRE member 0 or CFR member 1 depicted in FIG. 2) for resilient operation in the event of a CRE 210 member failure.

The VCCM dynamically configures CRE 210 trunk ports to Core Servers 220 based on the configuration of Virtual CCAP Core 200. This may include LAG operation of ports on two different CRE 210 members (such as either CRE member 0 or CFR member 1 depicted in FIG. 2) for resilient operation in the event of a CRE 210 member failure.

Networking Overview

Figure 3:
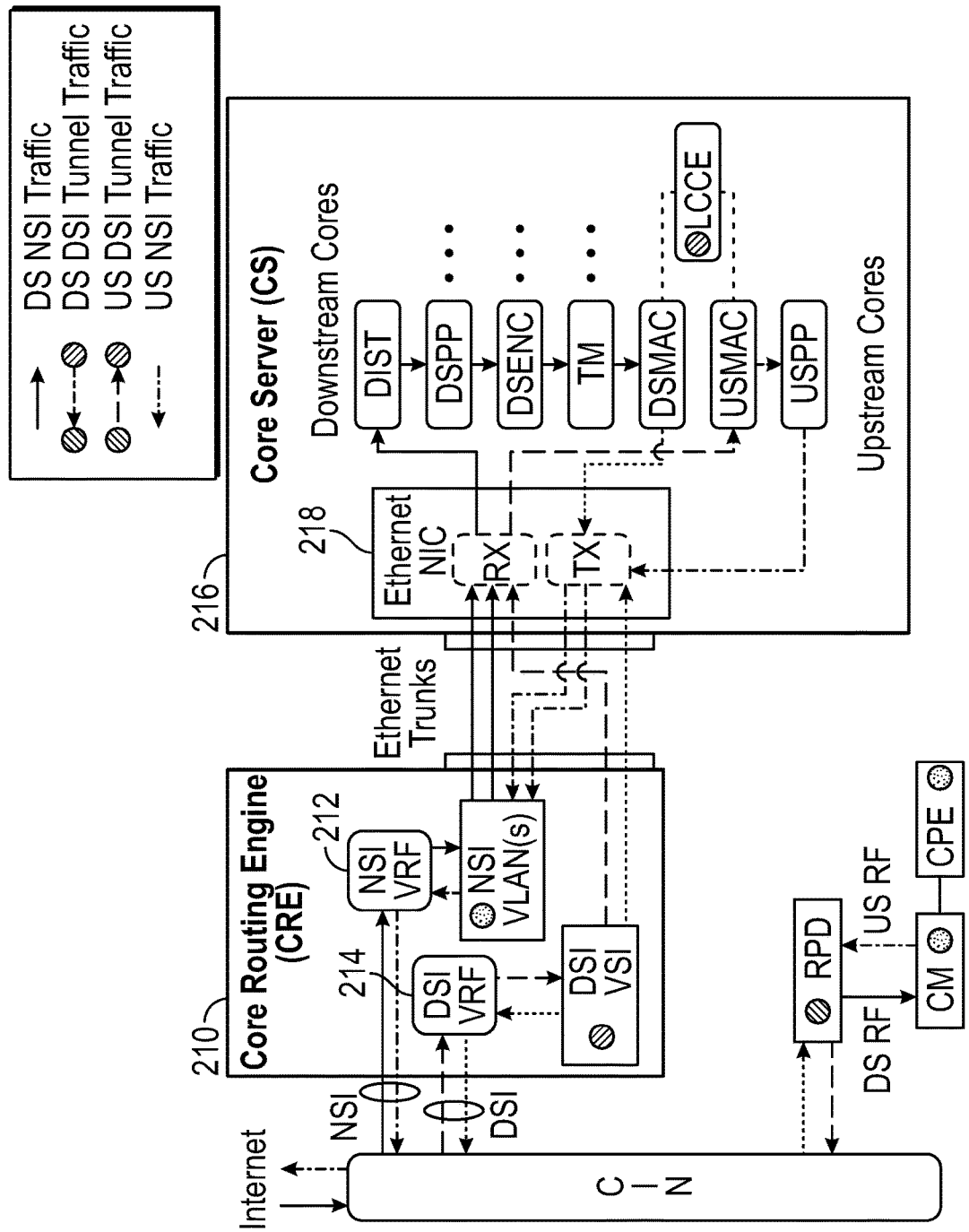
FIG. 3 is a block diagram depicting the forwarding of packets at Layer 2 and Layer 3 within a Virtual CCAP Core according to an embodiment of the invention.

FIG. 3 is a block diagram depicting the forwarding of packets at Layer 2 and Layer 3 within Virtual CCAP Core 200 according to an embodiment of the invention. As used herein, the term DOCSIS Side Interface (DSI) refers to the direction towards the DOCSIS RF links.

CRE 210 may implement separate Virtual Route Forwarder (VRF) entities intended to separate the IP routing of public Internet traffic (depicted in FIG. 3 as NSI VRF 212) and cable operator private CIN traffic (depicted in FIG. 3 as NSI VRF 214). Embodiments (not depicted in FIG. 3) of the invention may also implement a single Default VRF on CRE 210, in which case the functions described for both the NSI VRF 212 and DSI VRF 214 are implemented by the Default VRF.

As depicted in FIG. 3, Core Server (CS) 216 is a generic server that receives the trunk Ethernet packets on a Network Interface Card (NIC) 218 and distributes packets for processing among multiple CPU physical and logical cores. Unlike existing CMTS implementations, embodiments of the invention allow the CPU cores to be dynamically allocated between downstream and upstream processing.

In an embodiment, Core Server (CS) 216 uses the Intel Data Path Development Kit (DPDK) to perform a single thread of operation on a processor logical core with rings to hold packets between the threads. A "Distributor" (DIST) thread for each trunk NIC may distribute the packets based on hashing the destination MAC address to one of N "Downstream Packet Processor" (DSPP) threads. Each DSPP thread/core is provided with a Mac Hash Table that maps all known subscriber CM/CPE MAC addresses to a set of DOCSIS Service Flow classifiers. The DSPP thread may look up the destination MAC in Mac Hash Table to identify the destination CM, and may then apply the classifiers for that CM to the packet to determine the DOCSIS downstream Service Flow (SF). The classification may also determine the Security Association ID (SAID) for encrypting the packet contents.

The DSPP thread may then forward the packet to a DSENC thread to perform encryption. The particular DSENC thread instance may be selected by any of several means including but not limited to hashing, dynamic load balancing, and by assigning particular SAIDs to a particular DSENC core.

The DSENC thread may encrypt the packet with a mixture of software or by passing to a COTS encryption daughtercard (e.g., Intel Corporation's QuickAssist) within the Core Server 216. Software encryption is helpful for small packets or partial blocks of a large packet in order to avoid the overhead of setting up and retrieving packet communications to the encryption subcomponent.

DSENC may then forward the packet to a Traffic Management (TM) thread, which may place the packet on a queue per Service flow and schedules all such queues for transmission onto DOCSIS downstream RF channels. Advantageously, all Service Flows (SFs) of a Downstream Channel Set (DCS) may be scheduled on the same TM thread. Assigning a Mac Domain to a particular core also assigns all of the DCSs of that Mac Domain to the core.

The TM thread may forward to a Downstream Media Access Control (DSMAC) thread that encapsulates the packet into the Layer 2 Tunneling Protocol Version 3 (L2TPv3) tunnel for the data of a downstream RF channel. The source IP address of the L2TPv3 tunnel is a virtual Logical Control Connection Endpoint (LCCE) IP address for the tunnel. The destination IP address is for the RPD terminating the tunnel. The destination MAC address of the encapsulation is the ARP-resolved MAC address of the IRB of a designated DOCSIS Side Interface (DSI) VLAN on the CRE. All packets to the same L2TPV3 tunnel are forwarded by the same DSMAC thread in order to have consecutive sequence numbers per tunnel. The DSMAC thread performs MPEG fragmentation if necessary for the particular MHav2 tunnel mode. The DSMAC thread may then transmit the L2TPv3 encapsulated packet on an NSI port to CRE 210 for routing to an RPD.

In the upstream direction, an RPD streams information for a single upstream channel to a single L2TPv3 tunnel. Virtual CCAP Core 200 implements a multitude of LCCE IP addresses for purposes of terminating L2TPV3 tunnels.

Each LCCE IP address terminates at a single Core Server (CS) 216. All LCCE IP addresses are within an IP subnet defined by one of the IRB addresses in CRE's 210 DSI VLAN. All tunnels for the upstream channels of a given DOCSIS mac domain terminate at the same LCCE IP address.

CRE 210 may route the upstream tunneled packet to the DSI VLAN, and then to the particular Core Server (CS) 216 to which it has learned the MAC address for the destination LCCE IP address.

The upstream tunnel is forwarded to a software DIST module that permits flexible assignment of upstream tunnels among multiple 'USMAC' threads based on information not available with existing hardware based load balancing. The USMAC thread reassembles the stream of upstream bursts from different channels of the same mac domain into a sequence of packets for an upstream service flow (SF). The USMAC thread forwards the reassembled packets to an Upstream Packet Processor (USPP) thread to which the upstream SF has been assigned.

The USPP thread may use the SAID in the DOCSIS header of a packet to select the keys with which to use in decrypting the packets. Such decryption may be performed by commercial cryptographic hardware available to Core Server (CS) 216 or in software. The decrypted packet now has the same content as the original Layer 2 packet sent by the CM or Customer Premise Equipment (CPE). The destination MAC address of the packet will be the MAC address of a CRE NSI IRB. The USPP thread selects an NSI VLAN with which to encapsulate the upstream packet and forwards the packet to CRE 210 using the trunk encapsulation for that NSI VLAN. The USPP thread selects whether to perform CMTS forwarding either with Layer 2 ("L2VPN") forwarding or Layer 3 ("Cable Bundle") forwarding based on the upstream service flow and the source MAC address.

VLANs

The CRE's 210 VRF forwards at Layer 3 from a CRE NSI Ethernet port to a CRE internal VLAN, at which point the CRE 210 bridges at Layer 2 to and from trunk ports attached to that VLAN. The VLAN maintains a L2 forwarding table that associates an Ethernet destination MAC address with one (for unicast) or multiple (for non-unicast) "bridge ports" attached to the VLAN. CRE 210 may have several types of bridge ports that forward internal VLAN traffic, including but not limited to (a) an attachment to a VRF, referred to as an "Integrated Routing and Bridging" (IRB) link herein, (b) an attachment to one of the NSI/DSI Ethernet ports of CRE 210, (c) an attachment to a trunk port to a Core Server (CS) 216, and (d) an attachment to an MPLS tunnel to a Core Server (CS) 216.

In an embodiment, each Core Server (CS) 216 forwards packets to a set of DOCSIS MAC Domains. Each DOCSIS MAC domain is forwarded by a single Cable Server (CS) 216. Embodiments of the invention may dynamically assign MAC domains to Core Servers (CS) 216 in order to balance CPU loading on Core Servers (CS) 216. No existing integrated CMTS or CCAP Core features such flexible assignment of throughput to CPU computing resources.

Commercial switch routers offer several options for classifying the ingress of its Ethernet ports to internal VLANS as well as options for tagging the egress of internal VLAN traffic out to an Ethernet port. Embodiments may employ any of the approaches described herein, as well as other available, for selecting those options in order to implement Virtual CCAP Core 200.

The portion of a packet on the trunk port that identifies with which CRE VLAN it is forwarded is called the "encapsulation" of the VLAN within an Ethernet packet. Embodiments include but are not limited to such VLAN encapsulations as an IEEE 802.1q single VLAN tag, IEEE 802.1ad double VLAN tag, IEEE 802.1ah mac-in-mac, and MPLS labels.

Embodiments may employ a separation of VLANs attached to the NSI VRF 212 for Cable Modem (CM) and Customer Premise Equipment (CPE). Furthermore, embodiments may define and employ CRE VLANs for each type of DOCSIS Embedded Service/Application Functional Entity (eSAFE), which are a type of CPE embedded within a cable modem. A common eSAFE type is an Embedded Media Transport Agent (eMTA) to provide Voice Over IP services to a cable subscriber.

While embodiments may be described herein with reference to a single DSI VLAN attached to DSI VRF 214, other embodiments of the invention may be used with multiple DSI VLANs, e.g., for cases when there are multiple VRFs to reach different regions or classes of RPDs. Another envisioned case of the use of multiple DSI VLANs would be for virtual Core Servers implemented on a physical Core Server component; in this case a separate DSI VLAN would be accessed by a cluster of Virtual Core Servers.

The internal CRE "cluster VLAN" attaches to all Core Servers (CS) 216 of a cluster. Packets on the cluster VLAN may be identified on trunk ports either as untagged (as shown in FIG. 3) or with a tag known a-priori by all Core Servers (CS) 216.

The cluster VLAN also carries traffic for the Intelligent Peripherals Management Interface (IPMI) with which the VCCM manages between Core Servers (CS) 216, e.g., to force a Core Server (CS) 216 to reboot. Each Network Interface Card (NIC) maintains a non-volatile IPMI IP address (and mask). An operator may configure access to the NIC card IPMI functions independent of Virtual Core operation by configuring a CRE IRB for IPMI routing on the cluster VLAN.

FIG. 3 depicts IP host addresses within a network element as ovals. The filling of each oval depicts an IP subnet.

Each VRF in CRE 210 implements at least one IRB host address in each IP subnet operating on an internal VLAN to which CRE 210 provides layer 3 routing. At least one CRE IRB on the Internal VLAN is known a-priori by all Core Servers (CS) 216 capable of acting as the VCCM. This is called the "Cluster IRB," and is assigned in FIG. 4 as the IPv4 address 169.254.0.1. All other CRE IRB addresses are configured on the Virtual CCAP Core Configuration maintained by the VCCM.

Embodiments of the invention provide for the advantageous configuration on the VCCM of a designated "DSI" VLAN for tunneling from Core Servers to RPDs. That configuration consists of the CRE-resident DSI IRB IP address, an IP subnet mask, and the encapsulation of the designated DSI VLAN for the particular cluster of Core Servers 216. Upon startup, the VCCM configures all post-startup configuration of CRE 210, including the DSI VLANs, attaching trunk ports, DSI VLAN encapsulation, and DSI IRB host/subnet. The VCCM also communicates the DSI IRB host/subnet mask and encapsulation to all Core Servers 216.

The CCAP Core functionality for DOCSIS Layer 2 Virtual Private Networking (L2VPN) is provided by a CRE VLAN for each L2VPN configured for registering CMs.

When CMs register on a Core Server 216, that Core Server 216 communicates any L2VPN information to the VCCM. If the CRE VLAN for the L2VPN does not already exist, the VCCM adds it to CRE 210 via the CRE Control Tunnel.

Cable Bundle Forwarding

A traditional Layer 3 CMTS implements a concept called a "cable bundle" which is a collection of DOCSIS MAC domains which contain CMs and CPEs with IP addresses on a common IP subnet. Embodiments of the invention call for implementing a cable bundle as a set of CRE "NSI" VLANs, i.e. attaching to the NSI VRF. One NSI VLAN is designated for forwarding all CM traffic of a cable bundle. Other NSI VLANs are optionally defined for each "sub-bundle" of the cable bundle. Each IP subnet on a cable bundle or sub-bundle is defined by configuring an IRB on one of the NSI VLANs. The Virtual CCAP Core 200 configuration for a "top-level" cable bundle comprises a particular CRE NSI VLAN, its Core Server trunk encapsulation, and one or more IRBs corresponding to IP subnets shared among the CMs in the mac domains associated with the top-level cable bundle.

Figure 4:
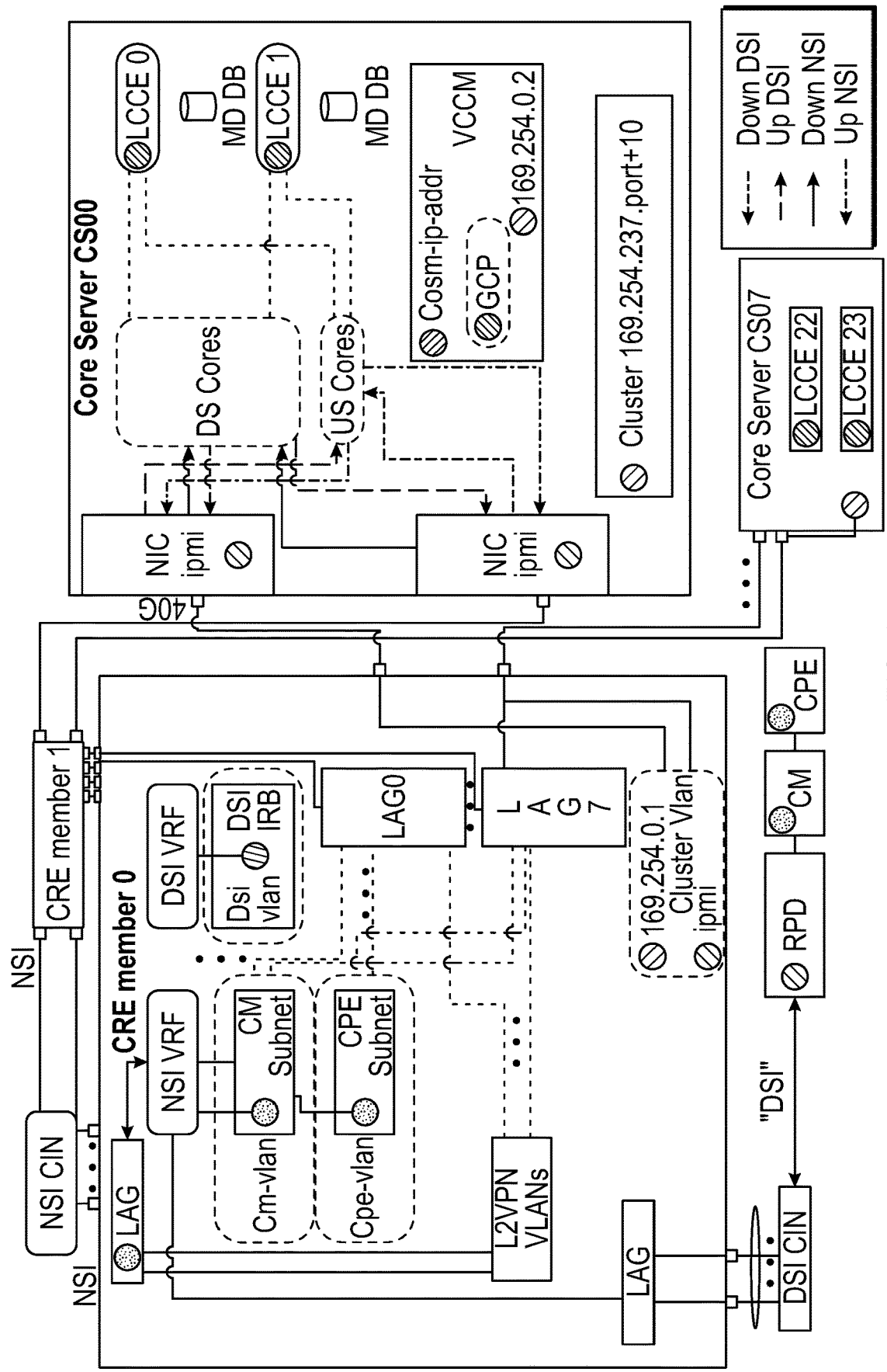
FIG. 4 depicts the forwarding of IP packets between the Internet and CMs/CPEs attached via an RPD according to an embodiment of the invention.

FIG. 4 depicts the forwarding of IP packets between the Internet and CMs/CPEs attached via an RPD according to an embodiment of the invention. CRE 210 advertises reachability to the cable bundle IP subnets to the Internet via its NSI VRF. When CRE 210 receives a downstream packet with a Layer 3 destination IP address that is within an IP subnet defined by one of its NSI IRBs, then CRE 210 forwards the received packet for Layer 2 bridging on the NSI VLAN that contains that IRB. Per normal IP routing, CRE 210 first (conceptually) performs an ARP lookup to find a host Layer 2 MAC address for the packet's Layer 3 destination IP address and prepares a Layer 2 packet to be bridged to the host. CRE 210 may then (at least conceptually in this order) look up the host's destination MAC in a Layer 2 forwarding table to forward to a particular trunk port. The two conceptual steps of ARP lookup and L2 forwarding table lookup are often physically implemented by a single TCAM lookup. CRE 210 forwards this "DOCSIS Ethernet" packet to Core Server 216 on a trunk port. This DOCSIS Ethernet packet has the encapsulation for the NSI VLAN.

A "sub-bundle" is a subset of CMs and CPEs reached through them. Existing CMTSs provide separate IP forwarding policies to sub-bundles that include (but are not limited to): (a) the DHCP server assigning the IP addresses along with DHCP relay forwarding options, (b) the set of Access Control List (ACL) filters, (c) the Virtual Route Forwarder (VRF) for IP traffic, (d) IP multicast routing options, (e) the Internet Service Provider (ISP), and (f) the Source Address Verification (SAV) policy for CPEs.

Embodiments of the invention enables a new approach of defining a "CPE VLAN" on CRE 210 for each sub-bundle and associating a subset of the CM VLAN IRBs with that sub-bundle. Core Servers 216 may monitor the forwarding of DHCP to CMs and determine the CRE VLAN IRB with the IP subnet to which the DHCP server assigns the CM. This provides the benefit of supporting cable sub-bundles by configuring the operation of a COTS switch/router rather than the custom programming required in existing integrated CMTS implementations to support sub-bundles.

L2VPN Forwarding

The Data Over Cable Service Interface Specification (DOCSIS) defines architecture for Layer 2 Virtual Private Networks (L2VPNs) that calls for a CMTS to forward the traffic of specially configured upstream service flows via L2 bridging to the CMTS external NSI port with a configured NSI "encapsulation", e.g. a single tag, double tag, or MPLS information. The downstream L2VPN forwarding from the NSI encapsulation to a CM joining an L2VPN has two modes: a "point-to-point" mode, for which the CMTS simply relays between the NSI port and a single CM, and a "point-to-multipoint" mode, in which the CMTS bridges among the NSI port and multiple CMs joining the L2VPN.

Embodiments of the invention support a Core Server 216 that learns of a new DOCSIS L2VPN from a CM to communicate that L2VPN identifier (ID), forwarding mode, and NSI encapsulation to the VCCM. For each unique L2VPN ID, the VCCM creates a VLAN on CRE 210 for the L2VPN with the CRE Control Channel. For each CM joining an L2VPN, the VCCM assigns a CRE-CS encapsulation for the CM on the trunk port or LAG to the Core Server 216 assigned to that CM's mac domain. If the forwarding mode is point-to-point, then the VCCM enforces that by ensuring that at most one CM may join a particular L2VPN ID associated therewith.

DOCSIS provides for a CMTS to acts as an IGMP proxy server by accumulating all joins from hosts in a MAC domain to a single join for the entire mac-domain. In traditional DOCSIS systems, a multicast router must process IGMP joins from each individual mac-domain. Embodiments of the invention support a new approach of aggregating the multiple mac domains on a same Core Server 216 to a single IGMP join, with the Core Server 216 replicating a multicast stream to all mac-domains on that Core Server 216. This has the advantage of reducing the bandwidth of multicast replication downstream of CRE 210 and reducing the IGMP control plane loading on the CPU of CRE 210.

Internal IP Address

Each Core Server 216, including the active and standby VCCMs, adds an IP interface on the cluster VLAN with a second pre-designated link-local IP subnet useable for internal inter-server communication, e.g. 169.254.240.x/24. This is called the "Internal IP Address" of the Core Server 216 in this description. Core Servers 216 may each select the host portion of the Internal IP address from LLDP information.

The Internal IP address is on a link-local subnet to prevent access from hosts external to CRE 210. The Internal IP address is analogous to private IP addresses used internal to a chassis-based CMTS by its line cards.

CRE 210 may implement a host IP address on the Cluster IP subnet to permit CLI access from the internal IP Addresses of the Active or Standby VCCM to switch forwarding involving the Functional VCCM IP addresses.

Management IP Address

A cable operator manages an existing industry L3 CMTS by accessing a single IP address usually configured as a router "loopback" address that it advertises as reachable on all NSI Ethernet ports.

Embodiments of the invention call for configuring a "Management IP Address" in the CCAP Configuration file. The VCCM dynamically programs CRE 210 to advertise reachability to the (single host) Management IP Address on all NSI interfaces. The VCCM also programs CRE 210 to statically route to that address via a next hop to the designated link-local active VCCM IP address, e.g. 169.254.0.2.

In this manner, CRE 210 shall forward all incoming external management IP traffic to the currently active VCCM.

The Active VCCM implements all cable operator management functions typically performed to a loopback IP address of a CCAP core including, but not limited to: SSH/telnet for CLI, SNMP, NetConf, and COPS.

VCCM High Availability

A particular Core Server 216 designated as the Standby VCCM may take over operation of the active VCCM. In one embodiment, Core Servers 216 execute the Linux operating system with the Pacemaker and Corosync cluster management software. The Pacemaker software entity on each Core Server communicates with its peer entities on other Core Servers 216 with link-local Internal IP addresses on the Cluster VLAN. Pacemaker "promotes" operation of the Active VCCM to one Core Server 216 and Standby VCCM service to a different Core Server 216.

When cluster management software detects that the Active VCCM is no longer operational on a Core Server 216 for whatever reason, it instructs the Standby VCCM to become the Active VCCM. With Pacemaker, this is called "promoting" the Active VCCM service to the Standby VCCM Core Server.

A Core Server 216 promoted to Active VCCM acquires the pre-designated link-local "Active Functional VCCM IP Address", e.g. 169.254.0.2 on the Cluster VLAN and surrenders the Standby Function IP address if it had been using it. A Core Server 216 demoted from Active VCCM operation surrenders the Active Function IP Address and acquires the pre-designated link-local "Standby Functional VCCM IP Address", e.g. 169.254.0.3. A starting Core Server 216 does not start active VCCM operation until instructed to do so by cluster management software.

Using well-known industry protocols for database replication (e.g. REDIS or Postgres), the Active VCCM replicates operational and configuration information to the Standby VCCM using the Functional VCCM IP addresses. On a controlled migration of VCCM operation, i.e. where both surrendering and acquiring Core Servers 216 remain operational, cluster management software sequences the turnaround of database replication to the opposite direction between Core Servers 216.

CCAP Core Virtual LCCE IP Address

The DOCSIS MHAv2 architecture calls for an L2TPv3 Tunnel to be established between the CCAP Core and the RPD. Each endpoint of this tunnel is called an L2TPv3 Control Connection Endpoint (LCCE). In an embodiment of the invention, Core Servers 216 implement a plenitude of virtual LCCE IP addresses. Each Core Server 216 implements at least one LCCE IP address, and may implement multiple LCCE IP addresses. The DEPI tunnels for DOCSIS MHAv2 operation extend from an RPD to an LCCE IP address implemented on a Core Server 216.

LCCE IP addresses reside in the same IP subnet defined by the DSI IRB. Multiple IP subnets for LCCE IP addresses may be defined with multiple DSI IRB on the DSI VLAN.

When one of the N Core Servers 216 fails, cluster management software migrates its LCCE IP endpoints among the N-1 remaining Core Servers 216. A key advantage of employing multiple Core Server 216 is that it permits operators to have finer granularity of redundant capacity, e.g. as compared to 1+1 redundancy for integrated CMTSs.

Migrating a Virtual IP Address

The Functional VCCM IP addresses, Management IP Address, and LCCE IP Addresses are all examples of a "Virtual" IP address that migrate from a "surrendering" to an "acquiring" Core Server 216. Robust operation of Virtual CCAP Core 200 requires rapid and reliable switching of CRE 210 forwarding from the surrendering to the acquiring Core Server 216 and maintaining CM registration.

Whenever a Core Server 216 acquires a Virtual IP address, it issues a gratuitous ARP reply on its trunk port (or LAG) to CRE 210. Whenever a Core Server 216 surrenders a virtual IP address and is still operating, the Core Server 216 may set a brief "link down" state on its trunk ports or, perhaps advantageously, restart its trunk LAG operation to rapidly discontinue CRE 210 forwarding to it.

On a virtual IP address migration, the post-migration VCCM may send action commands to CRE 210 via its CLI to accelerate the migration by performing actions such as, but not limited to: (a) removing or adding an ARP entry, (b) removing or adding an L2 MAC forwarding table entry, (c) moving the forwarding of an MPLS tunnel, (d) toggling the administrative state (up/down) of a trunk port, and (d) toggling the administrative state of a trunk LAG. In the situation where the Active VCCM Functional IP Address itself migrates, the acquiring Core Server 216 uses its Internal IP address to communicate with CRE 210.

CRE-CS Tunnels

With Ethernet VLAN encapsulation between CRE 210 and a Core Server (CS) 216, each NSI VLAN has a different bridge port on the physical port to each CS 216. When migrating a virtual LCCE IP address between Core Servers 216, CRE 210 must update its NSI VLAN bridge port forwarding tables. At the envisioned scale of tens to hundreds of mac domains per Core Server 216, the number of required L2 forwarding entry changes can be on the order of 10,000s of entries for a large scale system. Commercial switch/routers have near wire-speed learning of source mac addresses on a bridge port, so downstream forwarding after a migration will be practically unaffected to CM/CPE hosts that happen to send an upstream packet first after a migration. But for hosts for which the first packet after migration is a downstream IP packet, CRE 210 would have to broadcast an ARP request to all bridge ports and process an ARP response from the new bridge ports.

All known commercial L2/L3 routers handle ARP packets on a centralized CPU, often with configurable mechanisms to deliberately limit the rate of ARP handling so the CPU is not overwhelmed. Such ARP handling rate limits are typically on the order of 100 per second. Relying on ARP alone for CM/CPE forwarding recovery after an LCCE IP migration can therefore cause a worst-case loss of forwarding on the order of 100s of seconds.

Embodiments of the invention avoid this worst-case loss by calling for a tunnel between CRE 210 and a CS 216 rather than a VLAN tag. For example, such a tunnel can be an MPLS tunnel at Layer 2 or an IP tunnel at Layer 3. Each CRE-CS tunnel corresponds to a virtual LCCE IP address. The bridge ports of the CRE NSI VLAN L2 forwarding table are CRE side tunnel endpoints. When an LCCE IP address migrates, the tunnel remains in existence, only its endpoints change. The CRE L2 forwarding table is not affected, so the 10,000's of L2 forwarding entries associated with the LCCE IP do not need to be re-established. Advantages of tunneling between CRE and CS include: (a) reducing the time of data loss on a switchover, (b) increasing the number of hosts that can be supported by a single CCAP, thereby reducing the cost, size, and power of CCAP equipment, and (c) preventing timeouts to other protocols (e.g. OSPF timeouts) caused by CPU congestion.

Virtual Chassis and Virtual Slot

The configuration and management models standardized by the industry for a traditional CCAP have the concept of one chassis with a small number of slots. An RF line card in the slot has a limited number of ports (either upstream or downstream). Each port has a limited number of channels. This architecture is reflected in a common syntax among all existing CMTSs that represent a downstream channel with three integers: slot/port/channel. In current industry CMTSs, the "slot" and "port" indexes are at most two decimal digits, and the "channel" number is at most three decimal digits. The DOCSIS standard configuration model for CCAPs allocates one 8-byte byte for each of the slot, port, and channel indexes.

With the MHAv2 architecture, however, RPDs are identified in the DOCSIS management models only by IP address (for configuration) or a MAC address (for monitoring). Representing an RPD downstream channel requires representing three items: RPD/port/channel. The only standardized mechanism for representing an RPD in a user interface such as a Command Line Interface is with either the IP address or MAC address, both much longer than the 2-digit "slot" number for an integrated CCAP.

Embodiments of the invention call for administratively or dynamically assigning a "virtual slot" number to each known RPD. The "virtual slot" is a small integer, e.g. in the range 0 to 255. The RPDs virtual slot number is part of the Virtual CCAP configuration along with its IP address. Embodiments of the invention advantageously use of such a small integer in a CCAP Core to represent an RPD in the configuration input and output of a CMTS.

For installations with more than 255 RPDs, embodiments call for the administrative or dynamic assignment of a "virtual chassis" of RPDs. Such a virtual chassis is an arbitrary group of RPDs that operators may assign for any reason, e.g. the set of RPDs that are accessed from the same cable head-end or the set of RPDs within a particular geographic division.

Embodiments of the invention provide for identifying each virtual chassis with a small integer, e.g. in the range 0 to 255. Embodiments of the invention claim representation in the user interface of a CCAP core of a group of RPDs with a small integer. This includes the representation of a channel with an n-tuple such as virtual-chassis/virtual-slot/port/channel to represent a downstream channel.

The combination of virtual slot and virtual chassis service as a proxy for the RPD IP address or RPD MAC address that is significantly easier for customer configuration and monitoring.

Layer 2 RPD Connection

Figure 5:
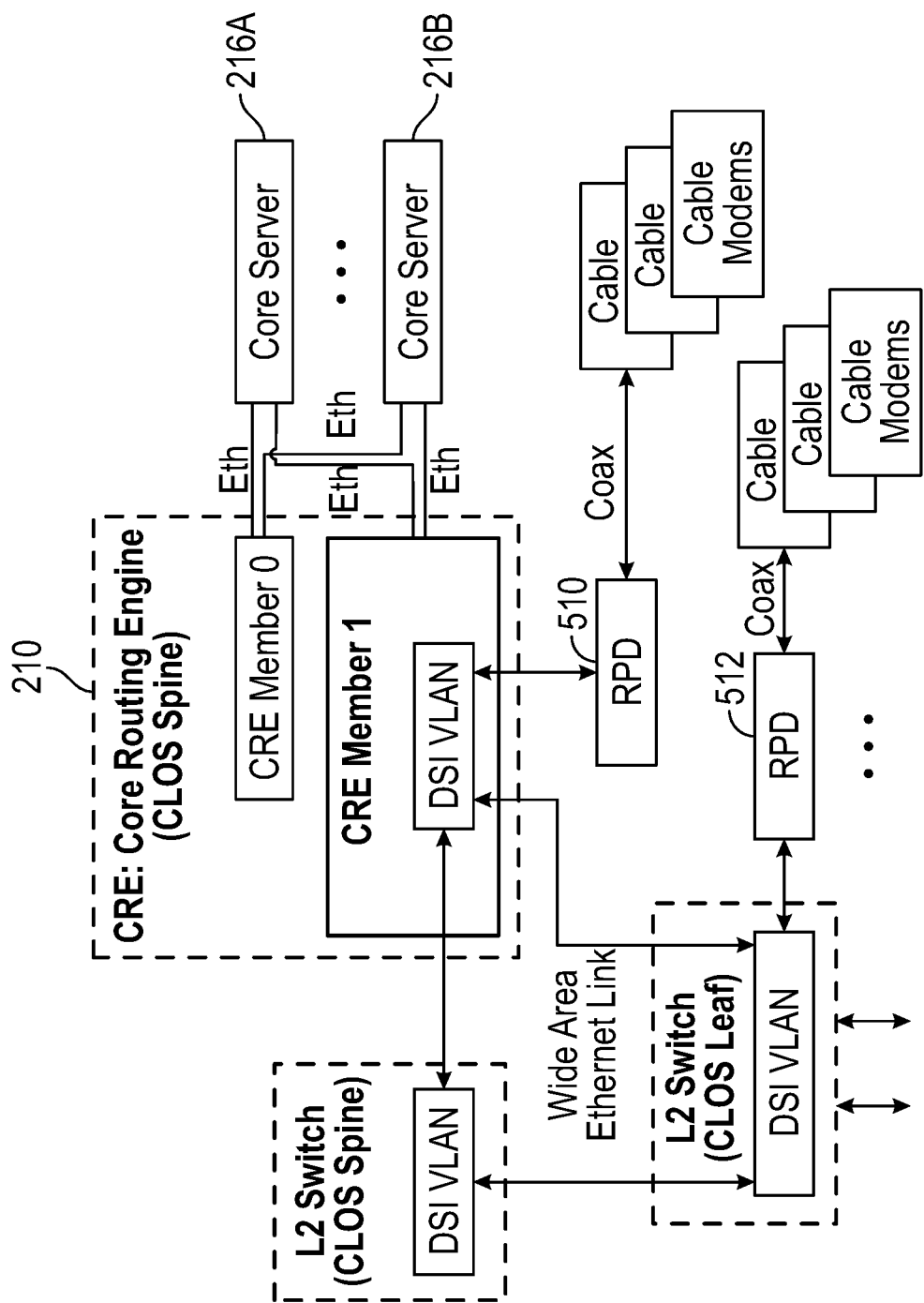
FIG. 5 is an illustration of a Layer 2 connection from CRE 210 to an RPD in accordance with an embodiment of the invention.

Embodiments of the invention support operation where RPDs connect to CRE 210 with Layer 2 bridging rather than with Layer 3 routing. FIG. 5 is an illustration of a Layer 2 connection from CRE 210 to an RPD in accordance with an embodiment of the invention.

RPD 510 is directly connected to an Ethernet port of CRE 210. That Ethernet port is configured to bridge to the DSI VLAN. RPD 510 obtains its own LCCE IP address via DHCP forwarded through CRE's 510 IRB on the DSI VLAN, and MHAv2 tunnels are established between the LCCE IP address on a Core Server (such as Core Server 216A for example) and the LCCE IP address on RPD 510. With a Layer 2 RPD connection, the LCCE IP address of Core Server 216A and the LCCE IP address of RPD 510 are on the same IP subnet since they are on the same layer 2 VLAN.

RPD 512 is connected to CRE 210 via a geographically distributed "CLOS" network of L2 switches consisting of "spine" L2 switches that form a backbone and geographically remote "leaf" L2 switches that directly connect to RPDs. The DSI VLAN is bridged between all the spine and leaf L2 switches, providing bridged L2 connectivity from a Core Server (such as Core Server 216B for example) to RPD 512. IP addresses and MHAv2 tunneling are the same as for RPD 510. Using layer 2 switches rather than layer 2/3 switch/routers for connection to RPDs offers advantages in cost and ease of configuration.

Loop Connected RPDS

Figure 6:
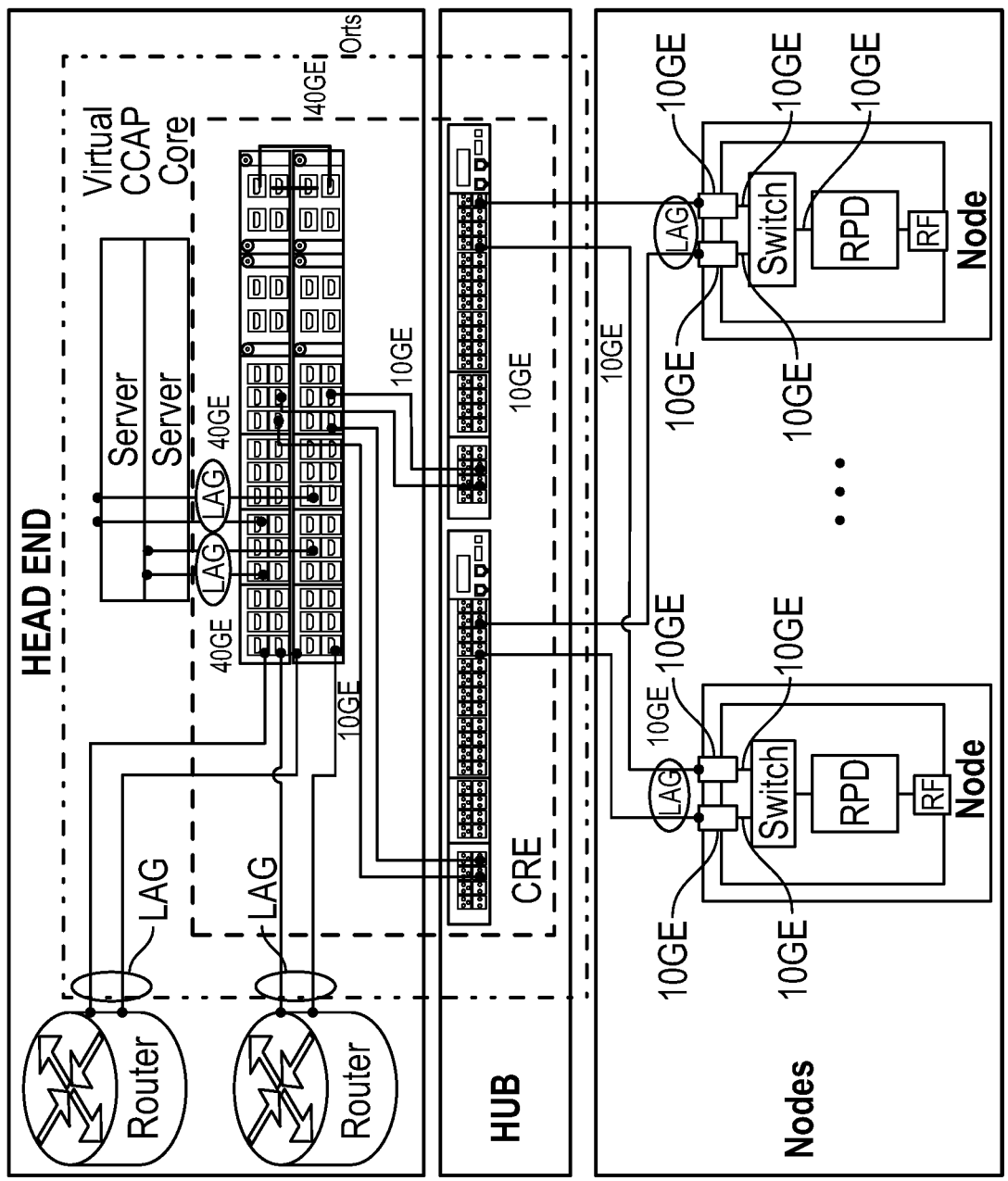
FIG. 6 depicts a geographically distributed CRE with RPDs directly attached to it in an advantageous loop topology according to an embodiment of the invention.

FIG. 6 depicts a geographically distributed CRE 210 with RPDs directly attached to it in an advantageous loop topology according to an embodiment of the invention. CRE 210 uses two ports to connect to either end of a daisy-chained connection of RPDs. Each RPD implements Layer 2 bridging between two Ethernet ports. CRE 210 operates a spanning tree protocol on either end of the loop to prevent infinite forwarding but still permit bridging to all RPDs on the loop in the event that either connection to CRE 210 fails. This loop topology of RPDs provides significant cost savings to the cable operator over connecting each RPD because only two switch ports are used rather than 2N switch ports for redundant connections to each RPD.

Because CRE 210 is geographically distributed, the Virtual CCAP Core 200 itself is geographically distributed, which is novel in the cable industry. A single central CCAP core at a headend with L2 switches at each HFC optical termination hub is significantly cheaper and simpler for an operator to manage than a separate CCAP Core in each hub location.

Embodiments of the invention are directed toward approaches for emulating the behavior of a Layer 3 routing Cable Modem Termination System (CMTS) with a commercial off-the-shelf (COTS) switch/router and one or more general purpose compute servers where customer configuration of the CMTS includes both operation of ports and routing features on the COTS switch/router and DOCSIS mac-domain operation of the CMTS.

Hardware Mechanisms

Figure 7:
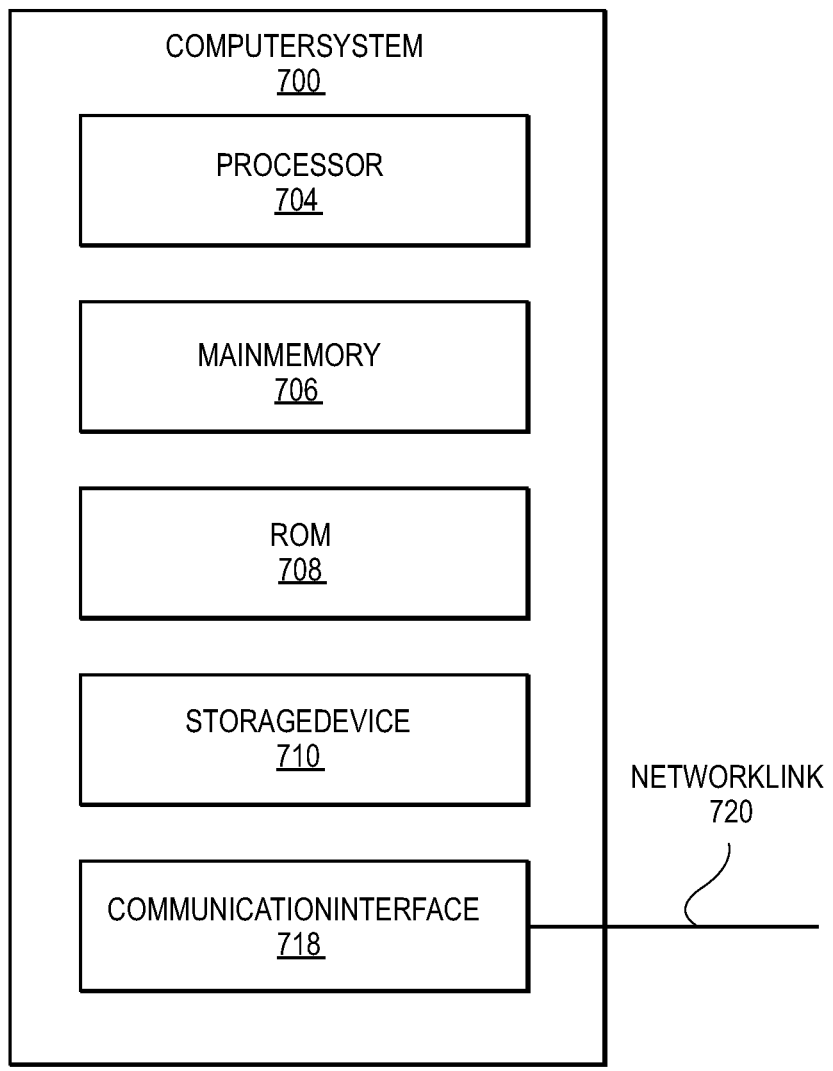
FIG. 7 is a block diagram that illustrates a computer system upon which an embodiment of the invention may be implemented.

FIG. 7 is a block diagram that illustrates a computer system 700 upon which software performing one or more of the steps or functions discussed above may be implemented. In an embodiment, computer system 700 includes processor 704, main memory 706, ROM 708, storage device 710, and communication interface 718. Computer system 700 includes at least one processor 704 for processing information. Computer system 700 also includes a main memory 706, such as a random access memory (RAM) or other dynamic storage device, for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device for storing static information and instructions for processor 704. A storage device 710, such as a magnetic disk or optical disk, is provided for storing information and instructions.

Embodiments of the invention are related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "non-transitory machine-readable storage medium" as used herein refers to any non-transitory tangible medium that participates in storing instructions which may be provided to processor 704 for execution. Note that transitory signals are not included within the scope of a non-transitory machine-readable storage medium. A non-transitory machine-readable storage medium may take many forms, including but not limited to, non-volatile media and volatile media. Non-volatile media includes, for example, optical or magnetic disks, such as storage device 710. Volatile media includes dynamic memory, such as main memory 706.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 704 for execution. For example, the instructions may initially be carried on a magnetic disk of a remote computer. The remote computer can load the instructions into its dynamic memory and send the instructions over a network link 720 to computer system 700.

Communication interface 718 provides a two-way data communication coupling to a network link 720 that is connected to a local network. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through a local network to a host computer or to data equipment operated by an Internet Service Provider (ISP).

Computer system 700 can send messages and receive data, including program code, through the network(s), network link 720 and communication interface 718. For example, a server might transmit a requested code for an application program through the Internet, a local ISP, a local network, subsequently to communication interface 718. The received code may be executed by processor 704 as it is received, and/or stored in storage device 710, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory machine-readable storage mediums storing one or more sequences of instructions for a virtualized Cable Modem Termination System (CMTS), which when executed by one or more processors, cause:
    said virtualized Cable Modem Termination System (CMTS) providing high speed data services to one or more remote physical devices (RPDs), wherein said virtualized Cable Modem Termination System (CMTS) comprises:
        a core routing engine (CRE) performing packet switching and routing; and
        one or more physical or virtual compute servers (CSs) that each perform CMTS functions for said one or more remote physical devices (RPDs),
        wherein a combination of said core routing engine (CRE) and said one or more physical or virtual compute servers (CSs) emulate a single Layer 3 CMTS having a single point of management.

2. The one or more non-transitory machine-readable storage mediums of claim 1, wherein said core routing engine (CRE) dynamically allocates resources of said virtualized Cable Modem Termination System (CMTS) between downstream packet forward and upstream packet forwarding.

3. The one or more non-transitory machine-readable storage mediums of claim 1, wherein said commercial off-the-shelf (COTS) hardware implementing said core routing engine (CRE) and said one or more physical or virtual compute servers (CSs) are arranged in one or more clusters to performing Network Function Virtualization (NFV).

4. The one or more non-transitory machine-readable storage mediums of claim 1, wherein said single point of management manages both routing and DOCSIS mac domain operations.

5. The one or more non-transitory machine-readable storage mediums of claim 1, wherein said core routing engine (CRE) implements a Link Aggregation Group (LAG) of at least two Ethernet ports for connections to other network elements including two or more of: (1) a first set of switch or routers that connect to the Internet via a Network Systems Interface (NSI), (2) a second set of switch or routers that connect towards head-ends and the one or more remote physical devices (RPDs) via a Converged Interconnect Network (CIN), and (3) trunk connections to said one or more physical or virtual compute servers (CS).

6. The one or more non-transitory machine-readable storage mediums of claim 1, wherein operation of said core routing engine (CRE) and said one or more physical or virtual compute servers (CS) are configured using a single configuration file maintained by one of said one or more physical or virtual compute servers (CS).

7. The one or more non-transitory machine-readable storage mediums of claim 1, wherein said core routing engine (CRE) comprises a NSI virtual route forwarder (VRF) for routing public Internet traffic and a DSI virtual route forwarder (VRF) for routing cable operator private Converged Interconnect Network (CIN) traffic, and wherein said NSI VRF is separate and distinct from said DSI VRF.

8. The one or more non-transitory machine-readable storage mediums of claim 1, wherein one of said two or more core servers is designated as a virtual CCAP core manager (VCCM).

9. The one or more non-transitory machine-readable storage mediums of claim 1, wherein each physical or virtual compute server (CS), of said one or more physical or virtual compute servers (CSs), connects to the core routing engine (CRE) with a Link Aggregation Group (LAG) of two or more Ethernet links.

10. The one or more non-transitory machine-readable storage mediums of claim 1, wherein said one or more physical or virtual compute servers (CSs) comprises at least two physical or virtual compute servers (CSs), and wherein responsibility for any CMTS function performed by a first physical or virtual compute server (CS) of said at least two physical or virtual compute servers (CSs) is assumed by a second physical or virtual compute server (CS) of said at least two physical or virtual compute servers (CSs) when said first physical or virtual compute server (CS) fails.

11. The one or more non-transitory machine-readable storage mediums of claim 1, wherein one physical or virtual compute server, of said one or more physical or virtual compute servers (CSs), implements a virtual IP address to which the one or more remote physical devices (RPDs) communicate.

12. The one or more non-transitory machine-readable storage mediums of claim 1, wherein each physical or virtual compute server, of said one or more physical or virtual compute servers (CSs), implements a separate L2TPv3 Logical Control Connection Endpoint (LCCE) IP address via which the one or more remote physical devices (RPDs) communicate.

13. The one or more non-transitory machine-readable storage mediums of claim 1, wherein Virtual LANs (VLANS) are employed on Ethernet links between the core routing engine (CRE) and the one or more physical or virtual compute servers (CSs).

14. The one or more non-transitory machine-readable storage mediums of claim 1, wherein Multiprotocol Label Switching (MPLS) Transport Stream tunnels are employed on Ethernet links between the core routing engine (CRE) and the one or more physical or virtual compute servers (CSs).

15. The one or more non-transitory machine-readable storage mediums of claim 1, wherein Ethernet links are established between the core routing engine (CRE) and the one or more physical or virtual compute servers (CSs), wherein one or more of: (a) a Virtual LAN (VLAN) and (b) a Multiprotocol Label Switching (MPLS) Transport Stream tunnel are employed on said Ethernet links, and wherein the VLAN or the MPLS tunnel encapsulates traffic for a Virtual Routing Function (VRF) implemented on the core routing engine (CRE).

16. The one or more non-transitory machine-readable storage mediums of claim 1, wherein Ethernet links are established between the core routing engine (CRE) and the one or more physical or virtual compute servers (CSs), wherein one or more of: (a) a Virtual LAN (VLAN) and (b) a Multiprotocol Label Switching (MPLS) Transport Stream tunnel are employed on said Ethernet links, and wherein the VLAN or the MPLS tunnel encapsulates traffic for IP hosts within a single CMTS cable bundle.

17. The one or more non-transitory machine-readable storage mediums of claim 1, wherein Ethernet links are established between the core routing engine (CRE) and the one or more physical or virtual compute servers (CSs), wherein one or more of: (a) a Virtual LAN (VLAN) and (b) a Multiprotocol Label Switching (MPLS) Transport Stream tunnel are employed on said Ethernet links, and wherein the VLAN or the MPLS tunnel encapsulates traffic for IP hosts in a single CMTS cable bundle for IP hosts distinguished by criteria gleaned from the DHCP protocol performed by those IP hosts.

18. The one or more non-transitory machine-readable storage mediums of claim 17, wherein the criteria gleaned from the DHCP protocol is the Embedded Service/Application Functional Entity (eSAFE) type of the IP hosts.

19. The one or more non-transitory machine-readable storage mediums of claim 1, wherein Ethernet links are established between the core routing engine (CRE) and the one or more physical or virtual compute servers (CSs), wherein one or more of: (a) a Virtual LAN (VLAN) and (b) a Multiprotocol Label Switching (MPLS) Transport Stream tunnel are employed on said Ethernet links, and wherein separate VLAN or MPLS tunnels encapsulated traffic for connection to the Network Side Interface (NSI) northbound of a traditional CMTS or a DOC SIS Side Interface (DSI) southbound of a traditional CMTS.

20. The one or more non-transitory machine-readable storage mediums of claim 1, wherein one of the physical or virtual compute servers (CSs) implements a virtual IP address intended for management functions of the virtual CMTS.

21. The one or more non-transitory machine-readable storage mediums of claim 20, wherein said management functions include access to said virtual CMTS using one or more of the following protocols: Secure Shell (SSH), Simple Network Management Protocol (SNMP), Telnet, Trivial File Transfer Protocol (TFTP), and File Transfer Protocol (FTP).

22. The one or more non-transitory machine-readable storage mediums of claim 1, wherein Ethernet links are established between the core routing engine (CRE) and the one or more physical or virtual compute servers (CSs), wherein one or more of: (a) a Virtual LAN (VLAN) and (b) a Multiprotocol Label Switching (MPLS) Transport Stream tunnel are employed on said Ethernet links, and wherein the VLAN or the MPLS tunnel carries traffic for a single DOC SIS L2VPN virtual LAN service.

23. The one or more non-transitory machine-readable storage mediums of claim 1, wherein the core routing engine (CRE) comprises two or more separate chassis members.

24. The one or more non-transitory machine-readable storage mediums of claim 23, wherein each physical or virtual compute server (CS), of the one or more physical or virtual compute servers (CSs), connects to at least two different Core Routing Engine (CRE) members.

25. An apparatus for operating a virtualized Cable Modem Termination System (CMTS), comprising:
one or more processors; and
one or more non-transitory computer-readable storage mediums storing one or more sequences of instructions, which when executed, cause:
said virtualized Cable Modem Termination System (CMTS) for providing high speed data services to one or more remote physical devices (RPDs), wherein said virtualized Cable Modem Termination System (CMTS) comprises:
a core routing engine (CRE) performing packet switching and routing; and
one or more physical or virtual compute servers (CSs) that each perform CMTS functions for said one or more remote physical devices (RPDs),
wherein a combination of said core routing engine (CRE) and said one or more physical or virtual compute servers (CSs) emulate a single Layer 3 CMTS having a single point of management.

26. A method for operating a virtualized Cable Modem Termination System (CMTS), comprising:
said virtualized Cable Modem Termination System (CMTS) for providing high speed data services to one or more remote physical devices (RPDs), wherein said virtualized Cable Modem Termination System (CMTS) comprises:
a core routing engine (CRE) performing packet switching and routing; and
one or more physical or virtual compute servers (CSs) that each perform CMTS functions for said one or more remote physical devices (RPDs),
wherein a combination of said core routing engine (CRE) and said one or more physical or virtual compute servers (CSs) emulate a single Layer 3 CMTS having a single point of management.

27. One or more non-transitory machine-readable storage mediums storing one or more sequences of instructions for a virtualized Cable Modem Termination System (CMTS), which when executed by one or more processors, cause:
said virtualized Cable Modem Termination System (CMTS) providing high speed data services to one or more remote physical devices (RPDs), wherein said virtualized Cable Modem Termination System (CMTS) comprises:
a core routing engine (CRE) performing packet switching and routing; and
one or more physical or virtual compute servers (CSs) that each perform CMTS functions for said one or more remote physical devices (RPDs),
wherein said one or more physical or virtual compute servers (CSs) each possess a set of CPU cores that are allocated between downstream and upstream processing.

* * * * *